Jan. 1, 1946.  J. W. FANKHANEL  2,392,238
CAP
Filed March 12, 1943
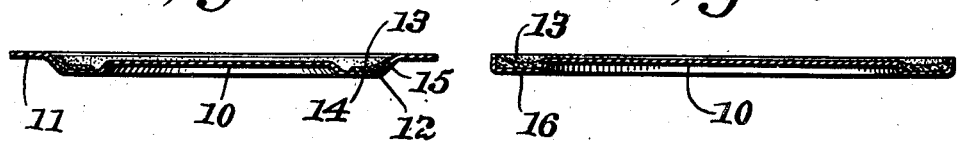
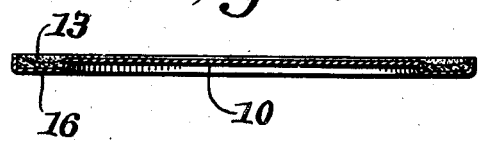
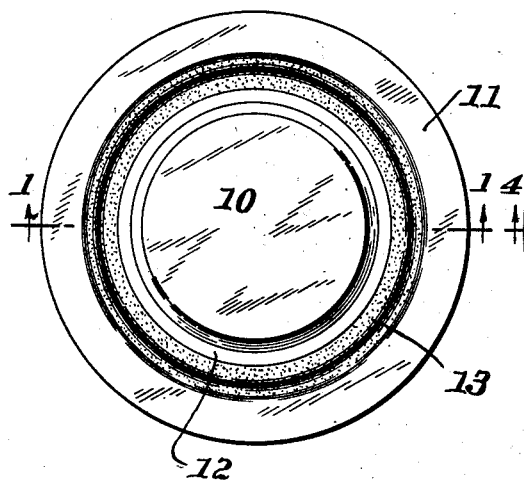
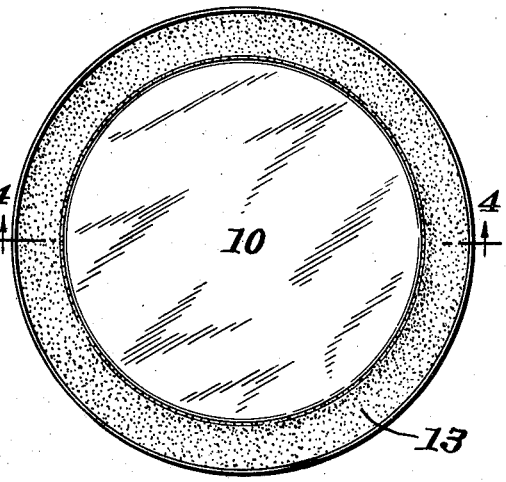
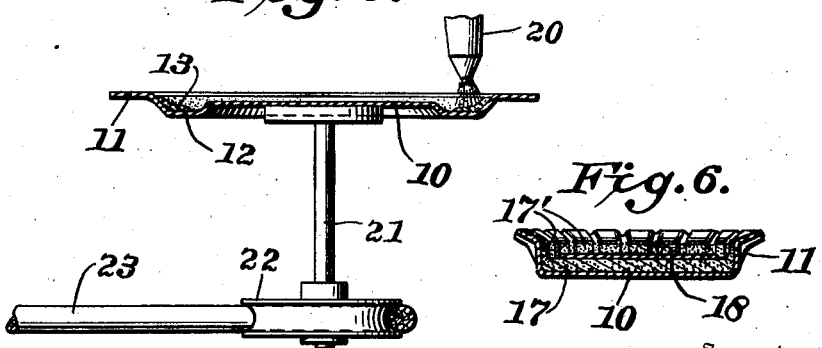
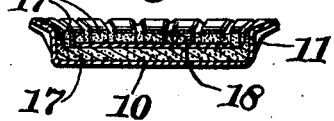
Inventor:
James W. Fankhanel,
By Cushman Darby & Cushman
Attorneys.

Patented Jan. 1, 1946

2,392,238

UNITED STATES PATENT OFFICE 2,392,238

CAP

James W. Fankhanel, Baltimore, Md., assignor to Crown Cork & Seal Company, Inc., Baltimore, Md., a corporation of New York Application March 12, 1943, Serial No. 478,936

2 Claims. (Cl. 215—40)

This invention relates to closures, such as pressed on caps or crown caps now used widely in sealing pressure beverages of the order of beer, ginger ale, Coca Cola, as well as numerous food products, such as fruit juices and tomato juice which are usually sealed under vacuum, and to sealing liners for such closures. Generally, these types of caps are provided with a suitable sealing means to engage the lip of a container and provide against leakage of liquids and gases. In the case of pressed on closures, the sealing materials have heretofore consisted of a rubber composition flowed into a groove or sealing surface, while in the case of crown caps the sealing means has mostly been of cork composition or other cushioning material. Both of these sealing materials have now become difficult to obtain and a satisfactory substitute is urgently required.

This application is a continuation-in-part of my application filed December 16, 1942, Serial No. 469,239, for Caps.

The principal object of the invention is to provide closures having sealing means including a glue salt which is made by reacting glue, such as hide glue, with an acid which will maintain the glue compound fluid in the presence of a glue insolubilizing agent, e. g., by forming an organic addition product which is a complex glue compound, and when dried and insolubilized has excellent resiliency and unusual resistance to water vapor and preferably is not objectionably acid.

An equally important object of the invention is to provide caps with a sealing material which may be applied with existing apparatus for the purpose. For instance, in the case of pressed on caps which have a groove for receiving the sealing material, it is common to dispense the sealing material as a fluid in measured amount from a tank, and deposit it automatically upon revolving caps which are consecutively positioned beneath the dispensing nozzle. Moreover, and as a decided improvement over such highly developed and high speed methods of production, the sealing material of this invention has the novel advantage of remaining fluid in the tank for a number of hours when heated at temperatures of about 80° F. to 110° F., and notwithstanding the presence of an insolubilizing agent. That is to say, the fluid sealing material in the tank is an aqueous solution which contains (1) at least 20% of the glue salt which is formed by reacting with the glue at least 5 to 10% nitric or other acid based on the dry weight of the glue, and (2) a glue curing or insolubilizing agent, such as hexamethylenetetramine. Preferably, the compound also includes an agent, such as glycerine or the equivalents hereinafter mentioned, for the purpose of preventing the insolubilized liner from becoming objectionably hard or horny and to impart thereto suitable flexibility and resiliency.

This composition, notwithstanding the presence of such a large amount of glue in aqueous solution and the presence of the active insolubilizing agent, remains stable and useful for about four to eight hours at the temperature mentioned without attention of any sort, except possibly to maintain a constant pressure in the tank to prevent evaporation of water caused by the creation of vacuum in the tank when the head of fluid therein is reduced. The results are quite unexpected, because the usual glue compounds containing 20% or more dried glue and an insolubilizing agent will quickly insolubilize if maintained at temperatures of the order mentioned.

Another object of the invention is to provide a sealing composition for caps which is applied thereto in fluid condition and which includes a glue salt formed by reacting an acid with the glue. This reaction gives two important results, namely, (1) the salt formed provides a more fluid solution than is obtained with untreated glue, and (2) when the acid is combined with the active groups of the glue molecule, the reaction of the glue addition compound with a curing agent such as hexamethylenetetramine, is retarded, and in this manner it is possible to hold the glue fluid in the presence of hexamethylenetetramine for a normal working period of, for example, four to eight hours, without insolubilization taking place. The reaction is to be distinguished from nitrating, which definitely does not occur, since none of the characteristic yellow color which develops when protein is nitrated is observed.

Another object of the invention is to provide caps with a sealing composition which is applied as a fluid and then dried and cured by heating in the usual manner to deposit a firm, resilient film or coating adhered to caps of metal, particularly metal having a lacquered or varnished surface, paper and plastic or synthetic material.

An equally important object of the invention is to provide caps with a sealing compound which is applied to the caps in fluid form and which does not objectionably flow and spread when heated for curing and drying. In this manner, the sealing material may be located precisely upon any area of a cap or cap groove without danger of the material flowing or spreading to reduce the effectiveness of the seal, i. e., a sealing layer of uniform thickness and width may be deposited exactly on the desired sealing area of the cap and cured without changed dimension.

A further object of the invention is to provide caps with a fluid sealing composition, including a suitable pigment, whereby an attractive and efficient seal for two-piece "Mason" and other caps is produced.

An additional object of the invention is to provide caps with a sealing material capable of holding a vacuum of 28" or greater, and consisting principally of a glue salt.

The accompanying drawing shows for purposes of illustration caps of the pressed on and crown types, but the invention may be used in connection with many other kinds of caps, and in fact wherever a tight seal is required.

In the drawing:

Figure 1 is a bottom elevational view of one form of pressed on cap, and particularly showing the sealing layer offset with relation to the sealing groove.

Figure 2 is a section on the line 1—1 of Figure 1.

Figure 3 is a bottom elevational view showing another form of pressed on cap having the sealing layer over the entire area of the bottom of the groove.

Figure 4 is a section on the line 4—4 of Figure 3.

Figure 5 shows the conventional means of applying a fluid glue layer to caps of the order of those shown in Figures 1 to 3, and particularly shows the application of the sealing layer in offset relation to the groove as illustrated in Figures 1 and 2, and Figure 6 is a sectional view of a crown cap in which the usual cushion layer of cork composition is replaced by a sealing layer of the present invention with which may or may not be associated a spot facing of paper, foil, or chemical composition, such as chlorinated rubber, the facing being preferably used in sealing carbonated beverages; the cushion layer is applied in the same manner shown in Figure 5 and advantageously covers the adjacent area of the skirt including the crimped portion thereof.

Referring to Figure 1, the cap has a top 10 and a skirt 11, and an intermediate circular sealing groove 12 best shown in Figure 2. On the wall of this groove 12 is deposited a layer of the sealing material 13, and it will be noted that this sealing layer does not completely cover the area of the groove, but rather a part of the bottom 14 and the outside wall 15 of the groove. In Figures 3 and 4, the cap comprises a top 10 and a sealing groove 16, as best shown in Figure 4, the entire area of this groove being provided with a sealing layer 13.

In Figure 6, the crown cap has a top 10 and a skirt 11 within which is disposed a cushion or sealing layer 17 formed of sealing material in accordance with this invention. In addition to the cushion 17, the sealing material coats the adjacent wall of the skirt including the crimped portion with a sealing layer 17' continuous with the cushion layer. On the face of the cushion 17 there is shown a center spot 18 of paper, foil or chemical compound, such as chlorinated rubber. This spot may or may not be used, as required.

In preparing the sealing compound according to a preferred procedure, dry granulated glue, such as hide glue, is added to water and mixed for about ten minutes. Then, an acid, preferably nitric acid (S. G. 1.4 to 1.5—70% to 80% concentration) although sulfuric or hydrochloric, acetic or oxalic acids may be used, is poured in slowly while the solution is continuously stirred. This avoids accumulation of high concentrations of acid in any one spot and prevents nitration of the glue. If part of the water is held out, more dilute acid may be used. The solution is then warmed for approximately fifteen minutes at about 110° F. or until all the granules of glue have been dissolved. The temperature is then brought up to about 175° F. and held for about fifteen minutes more or less to cause the reaction between the glue and acid. Glycerine and filler are then added and mixed well into the solution. The glue is cooled to about 100° F., and then the curing agent, such as hexamethylenetetramine or formaldehyde is added and mixed, and the composition is ready for use. Too much heating, i. e., at too high temperature, of the aqueous solution of glue salt renders it extremely fluid, whereas prolonged heating even at a low temperature precipitates the glue. On the other hand, the glue solution prepared as above, may be stored cold in a gelled condition and will be suitable for at least thirty hours or more for return to its desired fluid condition by warming.

The glue reaction with the acid in the water aids in the solution of the glue, and also forms an addition product. It is this addition product, namely, the glue salt, which forms a highly satisfactory sealing material. The glue salt not only has increased solubility in the water, but maintains the fluid glue stable at elevated temperature, e. g., 80° F. to 100° F., for a normal working period of say four to eight hours, and in the presence of the glue curing agent. This permits the use of a glue solution containing better than 20% glue, e. g., 23%, for a longer working period at elevated temperature. Glycerine is used to keep the glue compound flexible and somewhat resilient after the water has been evaporated and the glue has cured on the cap by application of heat. Instead of glycerine, any suitable known glue plasticizer, such as polyhydric alcohols, glycols, namely, propylene glycol and ethylene glycol, as well as invert sugar or simple sugar, e. g., molasses, may be used. Any inert filler, for instance, diatomaceous earth, i. e., "Dicalite" or wood flour, clay, talc, all of which should be of suitable fineness, is added to give body to the composition.

The following formulae are suitable:

*Example I*

| | Parts by weight |
|---|---|
| Glue | 25 |
| Water | 42. |
| Acid, nitric (S. G. 1.4) | 1.25 |
| Glycerine | 25 |
| Filler (Dicalite) | 10.75 |
| Hexamethylenetetramine solution (40%) | 2.5 |

*Example II*

| | Parts by weight |
|---|---|
| Hide glue | 150 |
| Water | 210 |
| Nitric acid (S. G. 1.502) | 15 |
| Glycerine | 150 |
| Dicalite | 75 |
| Hexamethylenetetramine solution (40%) | 30 |

These formulae produce an acid solution, but the cured compounds exhibit no evidence of appreciable or objectionable acidity when distilled water in which some of the caps having a sealing layer thereon were boiled thirty minutes without showing any trace of acid. The compounds are stable against dry temperatures up to 225° F. and will resist moist temperatures up to 180° F.

An important characteristic of the formulae resides in the use of at least 20% glue or higher, which is maintained in stable solution by reaction with the acid, e. g., nitric acid, in the amount of at least 5 to 10% based on the dry weight of the glue, and for at least four to eight hours at elevated temperatures of the order mentioned. When an insolubilizing agent is added to an ordinary glue compound and then the same subjected to heat, insolubilizing takes place within an hour or two; but this is not true of the compound of this invention. The acid solution is not neutralized, but is allowed to react with the glue as explained, to form the glue salt or addition product. In other words, the chief purpose of the acid is to form a glue compound which remains fluid as described in the presence of the insolubilizing agent and it is believed this is accomplished by forming an addition product with the protein molecules of the glue.

As will be apparent, the protein molecule of glue forms an addition product with acid. The end amine group of each molecule is usually the most active, and it is with this group (the most active) that straight addition generally takes place forming a salt. However, the salt formation is not limited to free $NH_2$ groups. This reaction has two functions, namely, (1) the salt formed provides a more fluid solution than that obtained with nitrated glue, and (2) when the acid is combined with the active groups of the glue molecule, reaction of the glue with formaldehyde, or formaldehyde which is liberated from hexamethylenetetramine, is retarded. Therefore, we are able to hold the glue compound with hexamethylenetetramine added for a relatively long period of time without insolubilization taking place. The reaction is to be distinguished from nitration which definitely does not occur, since none of the characteristic yellow color which develops when protein is nitrated, is observed.

Referring to Figure 5, the numeral 20 shows a dispensing nozzle for delivering a measured amount of the fluid sealing material into the groove 12 of a cap, such as shown in Figure 2, and forming therein a sealing layer. The cap is mounted on a rotating spindle 21 which is rotated by means of the pulley 22 and belt 23. The sealing layer may be produced in any of the caps shown in Figures 1, 3 and 6 after the manner described in Figure 5. When using this composition, it is maintained in the supply tank of the cap lining machine in a suitably liquid condition, as described below, by the application of heat to maintain a temperature of about 80° F. to 100° or 110° F. The acid should be incorporated in the material in a quantity sufficient to maintain the liquidity desired for proper dispensing from the supply nozzle at these temperatures and to preserve this liquidity for a suitable predetermined working period, such as from four to eight hours, the insolubilizing effect of the insolubilizing agent thus being retarded sufficiently to permit proper functioning of the lining apparatus.

After the sealing layer has been deposited in the sealing groove or as a cushion, as shown in Figure 6, it is suitably dried, as by means of passing the caps through an oven, and subjecting them to warm air.

The consistency of the fluid sealing material is an important factor. A compound that is too heavy will not flow sufficiently to make a complete ring within the cap, and a compound that is too thin flows objectionably out of place and produces a gasket too thin for efficient sealing. The viscosity of the fluid finished product preferably should be between 160 and 180 when tested on a Stormer viscosimeter at 100° F. in order to facilitate assembly of the liner composition and the closure shell. In some instances, more or less viscous compositions may be used. The Stormer viscosimeter used was equipped with a 150 gram load.

From the foregoing, it will be understood that to the glue and its solvent which, in the present instance, is water or a mixture of water and a glycol, there is added an acid the amount of which is proportioned to the glue and to the insolubilizing agent, so that the composition will remain liquid for ready distribution through the nozzles of the lining machines for a reasonable working period, say from four to eight hours, while being heated, say from 80° to 100° or 110° F., in the tank of the lining machine. Moreover, the acid, glue and insolubilizing agent are proportioned so that not only will the composition remain liquid for a predetermined period, for example the period above specified, but also will insolubilize within a predetermined period after application to the closure. It is desired, of course, that the composition quickly insolubilize under baking temperatures when it has once been applied to a closure in order to prevent movement or deformation of the liner in the cap while being baked and while the composition is insolubilizing. There is, therefore, a definite relationship between the acid and the insolubilizing agent, since it is desired not only that the composition remain liquid for a predetermined time, but that it insolubilize within a predetermined time after the composition has been applied to the closure.

As stated above, the sealing material may be prepared so that it has a viscosity which will cover a predetermined area of the cap and the subsequent heating to dry and cure the coating does not cause the same to spread or flow. The sealing layer is continuous and is of a thickness which will form a reliable and permanent seal when the cap is applied to a vessel.

The sealing material is adherent to metal, paper, plastic and synthetic material so that a separate adhesive is not required to form the construction shown in Figures 1, 3 and 6, although it is preferable where a center spot 18 is used to utilize an adhesive to adhere the spot to the dried surface of the cushion layer 17.

The expression "free acidity" as set forth in the claims is intended to cover a product prepared by the reaction of glue and an acid, such as nitric acid, in which the glue forms as an addition product and when tested as described hereinabove, does not disclose any substantial acidity.

I claim:
1. A container closure having a flexible, resilient sealing liner comprising a firm, sealing layer deposited from an aqueous liquid containing a water-soluble glue-acid addition product, an insolubilizing agent and a plasticizer, said layer consisting essentially of the water-insoluble reaction product of the said glue-acid addition product and said insolubilizing agent, and said plasticizer.

2. A container closure having a flexible, resilient sealing liner comprising a firm, sealing layer deposited from an aqueous liquid containing a water-soluble hide glue-nitric acid addition product, hexamethylenetetramine, and glycerine, said layer consisting essentially of the water-insoluble reaction product of said glue-acid addition product and said hexamethylenetetramine, and said glycerine.

JAMES W. FANKHANEL.